Nov. 13, 1962 C. P. ANDERSON ET AL 3,064,079

TAPE READER

Filed Jan. 29, 1960

5 Sheets-Sheet 1

INVENTORS
CARL P. ANDERSON
ROBERT L. KEARNEY
BY
Strauch, Nolan & Neale
ATTORNEYS Nov. 13, 1962 C. P. ANDERSON ET AL 3,064,079

TAPE READER

Filed Jan. 29, 1960 5 Sheets-Sheet 2

INVENTORS
CARL P. ANDERSON
ROBERT L. KEARNEY

BY Strauch, Nolan & Neale

ATTORNEYS

INVENTORS
CARL P. ANDERSON
ROBERT L. KEARNEY
BY
Strauch, Nolan & Neale
ATTORNEYS INVENTORS
CARL P. ANDERSON
ROBERT L. KEARNEY
BY
Strauch, Nolan & Neale
ATTORNEYS Nov. 13, 1962 C. P. ANDERSON ET AL 3,064,079

TAPE READER

Filed Jan. 29, 1960 5 Sheets-Sheet 5

INVENTORS
CARL P. ANDERSON
ROBERT L. KEARNEY

BY

Strauch, Nolan & Neale

ATTORNEYS

United States Patent Office 3,064,079
Patented Nov. 13, 1962

3,064,079

TAPE READER

Carl P. Anderson, Evanston, and Robert L. Kearney, Northbrook, Ill., assignors to Smith-Corona Marchant Inc., Syracuse, N.Y., a corporation of New York Filed Jan. 29, 1960, Ser. No. 5,496
16 Claims. (Cl. 178—17)

This invention relates to printing telegraph apparatus and more particularly to telegraphic tape reading devices especially adapted to sense a tape and transmit corresponding coded signals.

Development of the device of this invention was a result of a need for a relatively high-speed demand type rerun tape reader for use in a central telegraphic switching center. Such a reader and its associated components, although obviously useful in other types of data processing, are used in a switching center to retransmit or rerun messages that were not received properly at the distant station the first time they were transmitted from the central switching center. When it is desired to rerun a message, that particular message is unwound from the storage reel on a monitor reperforator and inserted in the rerun reader. The rerun reader may be operated in either of two operational modes, known to the trade as "pullback" and "retransmission." Pullback operation is used when the message is to be retransmitted within the same operational time period that it was originally transmitted and in this operation the monitor reperforator is not used. Retransmission operation is used when the message is to be retransmitted during an operational time period subsequent to the time period in which it was originally transmitted. In this operation the monitor reperforator is included in the signal circuit to cut a new tape for the storage record. In each retransmission mode the operation of the reader itself is exactly the same, resulting in transmission by the reader of simultaneous teletypewriter code signals to a transmitter-distributor which converts the simultaneous code signals it receives to start-stop, five unit sequential teletypewriter code signals. The cyclical operation of the rerun reader is in turn controlled as demanded by the transmitter-distributor.

The reader of the present invention, being a demand type, will be utilized with some other device that signals the reader whenever it is ready to receive a simultaneous group of code signal impulses whereupon the reader will cycle to step the tape, sense a code combination group from a punched message tape and set up a permutated circuit switch arrangement for simultaneous transmission. Operating power is derived through a solenoid energized and deenergized by means of a demand signal circuit. The solenoid, when energized, cocks the sensing and switching mechanism and when deenergized will enable sequential tripping and desired fixed cyclic time lapse operation of all mechanical functions of the reader regardless of the over-all demand rate. The switching arrangement resulting from the mechanical sensing of the tape enables the reader to store a combination code signal for transmission, through a plurality of circuits, of simultaneous electrical impulse signals corresponding to the punch code group on the tape.

A primary object of this invention resides in the provision of a novel compact device capable of reading punched code tape and providing for transmission of simultaneous code signals to an associated transmitter-distributor corresponding to the information which is read.

Another object resides in the provision of a novel tape reader, the cyclical operation of which is controlled by an associated transmitter-distributor.

A further object resides in the provision of a novel tape reader which has no included time rate base for control at steady speed but is capable of being operated at different rates of over-all speeds, as demanded, under the control of electrical demand signals from an associated processing device.

Still another object resides in the provision of a novel coded punched tape reader having three major subcomponents: a tape sensing and switch selecting assembly; an assembly for tape feed and triggering the sensing assembly when cocked; and a cyclically oscillatory power assembly for cocking the sensing assembly and feed assembly and for tripping the feed and triggering assembly. In conjunction with the foregoing object a still further object resides in the incorporation of a manual control structurally inter-related with the feed assembly for retracting all tape sensing components and freeing the tape feed device.

Further novel features and other objects of this invention will become apparent from the following detailed description, discussion and the appended claims taken in conjunction with the accompanying drawings showing a preferred structure and embodiment, in which:

Figure 15:
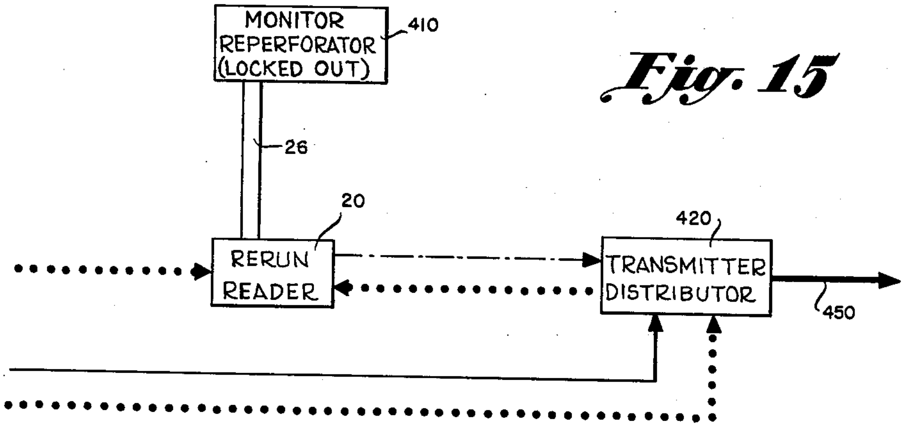
FIGURE 15 is a block diagram illustrating the reader of this invention used in the "pullback" operation.
Figure 16:
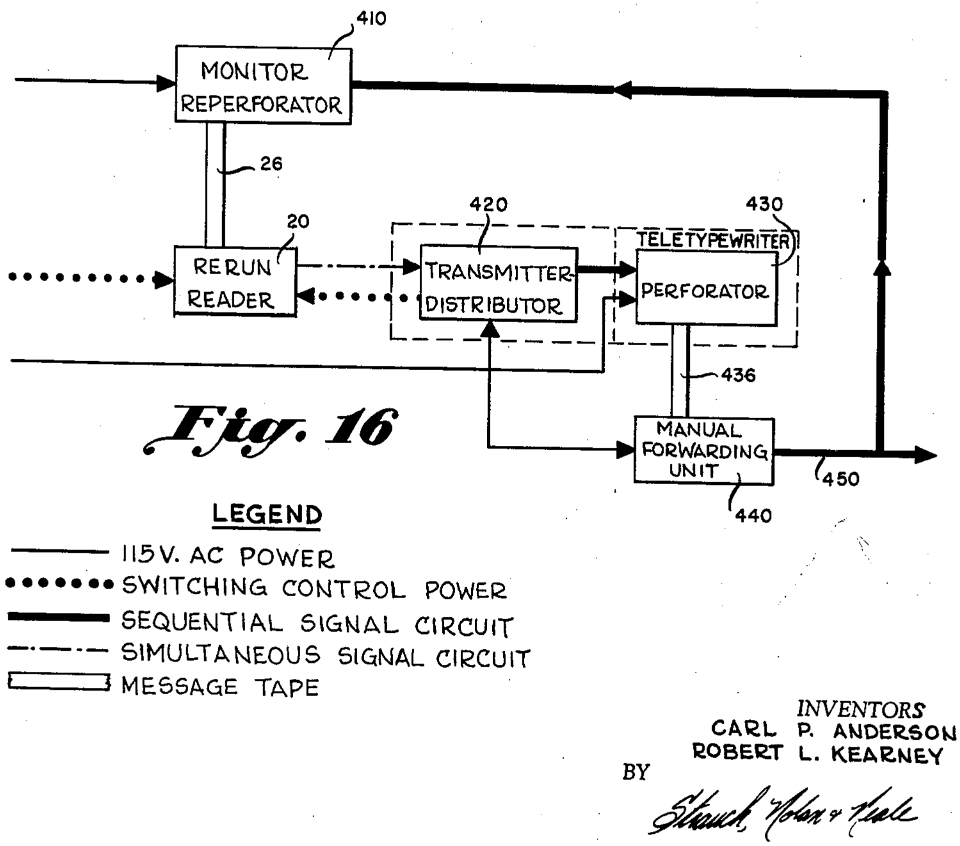
FIGURE 16 is a block diagram illustrating the use of the same reader in the "retransmission" operation.

Before proceeding to a specific description of the mechanical and operational aspects of the reader components, it is to be understood that the exemplary reader is devised for utilization as a rerun reader in a message signal center and is adaptable by means of appropriate circuitry to be placed in the signal system circuit in one of two modes of operation, (1) pullback and (2) retransmission. The manner in which the reader operates in conjunction with other components in the signalling system will be described with reference to the block diagrams (FIGURES 15 and 16) following the operational description of the reader.

Figure 1:
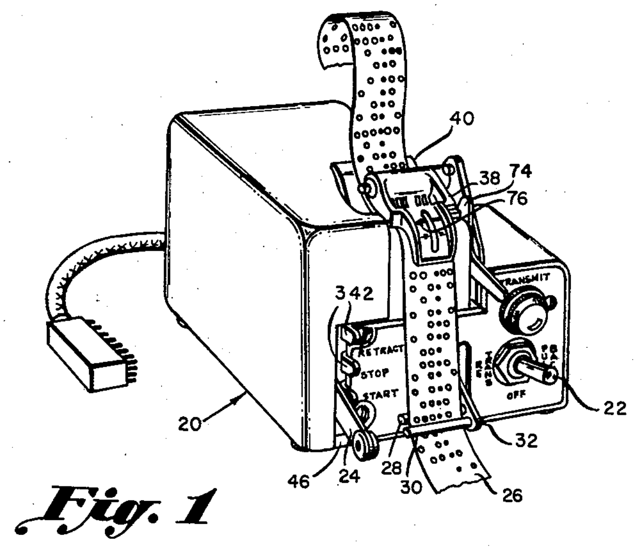
FIGURE 1 is a perspective view of a rerun reader with outside cover incorporating the present invention.

Referring now to the drawings for specific details of the reader construction, FIGURE 1 illustrates the tape reader 20 with cover 21, a small compact self-powered unit including its power control switch 22, a three-way switch having positions for two types of reader operation and a "power off" position. Reader 20 also has a mechanical control lever 24 projecting forwardly from the front face of the reader. A tape 26 being read passes through two horizontal pins 28 and 30 of a tight tape lever 32 (to be hereinafter more fully described), the tape then passing upwardly over a feed roll 34 which includes a tape feed sprocket wheel 36. At this point the tape passes under a pivoted tape lid 38 over a guide plate 40 and thence out of the machine.

Figure 2:
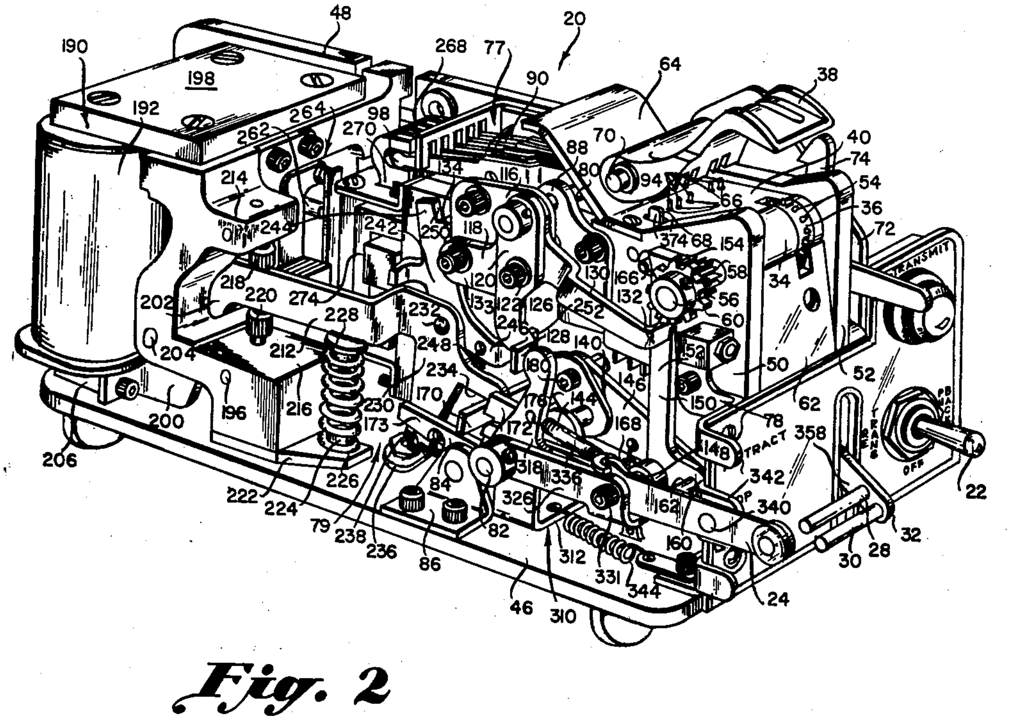
FIGURE 2 is a perspective view of the rerun reader with cover removed to illustrate the assembled relationship of all components.

The various details of the basic machine components and their functional cooperation with each other will be described primarily with reference to FIGURE 3. However, since FIGURE 2 illustrates the assembled organization of all components of the reader 20 with the machine cover removed, a better understanding may be reached if both figures are referred to during the initial portion of the description. The machine 20 includes a rigid base plate 46 to which are secured a vertical side plate 48 (at the rear of FIGURE 2) and two vertically arranged feed sprocket mounting plates 50 and 52 (at the right hand side of FIGURE 2). Other units to be described later in this description are secured to various ones of these plates.

Clearly shown in FIGURE 2, the tape feed roll 34 and sprocket wheel 36 with feed pins 54 secured circumferentially therein is disposed horizontally between the upper portion of the two mounting plates 50 and 52, being non-rotatably secured to a feed shaft 56 which is rotatably journalled in the two mounting plates 50 and 52. Shaft 56 projects through and beyond mounting plate 50 (nearest the viewer) and carries a toothed ratchet wheel 58 and a notched register wheel 60 non-rotatably secured to the projected end. The feed holes in a conventional message tape, when passed over feed roll 34, will index with and fit on the feed pins 54 in sprocket wheel 36. Stepped rotation of the feed shaft 56, by means to be hereinafter described, will cause a stepping movement of the tape 26 under the tape lid 38 and across guide plate 40. A small front plate 62 used as a brace and as a closure to prevent incorrect tape insertion is secured between the two mounting plates 50 and 52.

The aforedescribed guide plate 40 has a flat horizontal work station portion secured as by screws to the top edges of mounting plates 50 and 52 with its beveled forward edge disposed closely adjacent the feed roll 34 and notched to permit passage of the sprocket wheel feed pins 54. The rear portion 64 of guide plate 40 is bent upwardly to form a deflecting guide for exit of the message tape 26. A lateral series of sensing pin holes 66 (see FIGURE 3) are provided through the horizontal portion of guide plate 40 just ahead of the inclined portion 64. At one side of the lateral row of sensing pin holes 66 a larger hole 68 is provided for a tape-out sensing pin (to be later described). The aforedescribed tape lid 38 is mounted on a horizontal journal post 70 secured in a side plate 72 fastened on the outer side of mounting plate 52. Lid 38 is biased by means of a spring (not shown) to its raised position in FIGURE 2. Also pivotally secured on the outer side of mounting plate 52 is a tape lid latching lever 74, the upper end of which coacts with an edge formation on the tape lid 38 (as shown in FIGURE 1) to maintain the tape lid in a closed position. In closed position the undersurface of tape lid 38 maintains the tape snug but freely slidable against feed roll 34 and the uppersurface of guide plate 40. At this point we note that an arrow 76 (FIGURE 1) is embossed on the uppersurface of tape lid 38. As will be described later in the operational portion of this description, the arrow 76 provides a visual indicator to aid in the initial placement of a message tape on sprocket wheel 36.

Figures 3, 4:
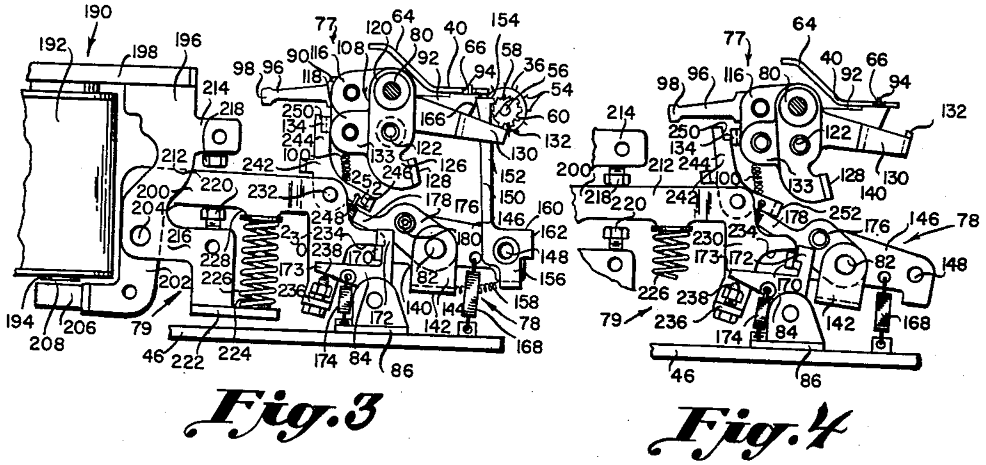
FIGURE 3 is an explanatory side elevation view illustrating the three major operational subassemblies; components such as the manual control and printed circuit switches being omitted for clarity, the solenoid being energized and all mechanisms being in latched position ready for tripping by a signal pulse to the solenoid and to then complete a cyclic tape feed, sensing and transmitting step.
FIGURE 4 is a view similar to FIGURE 3 illustrating the position of the power assembly components and the feed and triggering components subsequent to de-energizing the solenoid (see FIGURE 6 for the retract position of the tape sensing levers which occurs between the positions in FIGURES 3 and 4)

At this stage in the description, the normal operating components of tape reader 20 can be best understood if the viewer will visualize the components depicted in FIGURE 3 as consisting of three subassemblies. The first of these subassemblies, including the group of levers in the upper right hand portion of FIGURE 3, constitutes the sensing and registry assembly 77 mounted on a horizontal shaft 80. Below the sensing and registry group 77 is located the second subassembly, a triggering and tape feeding assembly 78, mounted on a horizontal shaft 82. The left hand portion of FIGURE 3 contains the third subassembly of power components 79, a portion of which extends toward the right into cooperative relationship with the aforenoted two groups of components 77 and 78. There is one further component which provides a cooperating functional relationship between the power group 79 and the feed group 78, a small double armed latching lever 84 pivotally mounted on a bracket 86 secured to the base plate 46. This latch lever 84 cooperates with the power group and the feed assembly to provide a feed lever latching and triggering device which will be fully described hereinafter.

In addition to the above three groups of basic operating components, there are several other operational components which cooperate in some manner with the aforenoted three groups of components or with the power supply. One of these, of course, is the control lever 24 which is manually operated and will be described following the description of the basic power operation components. Another is the aforementioned tight tape lever 32 which coacts through an electrical switch in circuit with the source of machine operating power and this will also be fully described hereinafter.

Inasmuch as the purpose for which this machine was developed was that of sensing the permutated arrangement of punched code holes in a message tape and transferring such mechanical representations into simultaneous electrical signals, it is felt that the machine will be most clearly understood by proceeding now with a detailed description of the structural organization of the tape sensing and registry assembly 77 with primary reference to FIGURE 3 and specific reference to FIGURES 4, 5, 6 and 7 for details which do not clearly appear in FIGURE 3.

The aforedescribed sensing assembly mounting shaft 80 is disposed horizontally below the inclined portion 64 of the tape guide plate 40, being mounted in holes provided in a side plate 88 secured on the feed roll mounting plate 50 and the aforedescribed side plate 72 mounted on the second feed roll mounting plate 52. By suitable collars secured to the ends of shaft 80, the shaft will be maintained axially in position. Pivotally supported on the shaft 80 between plates 72 and 88 is a group of flat elongated sensing levers 90, maintained in appropriate axially spaced relationship between the plates 72 and 88 and relative to each other by spacer sleeves and washers (not shown). The actual number of these sensing levers 90, of course, will depend upon the code system being used in the tape which is being read. In the exemplary disclosure a five unit code is depicted and, accordingly, five sensing levers 90 are illustrated (FIGURE 2).

Figures 5, 6:
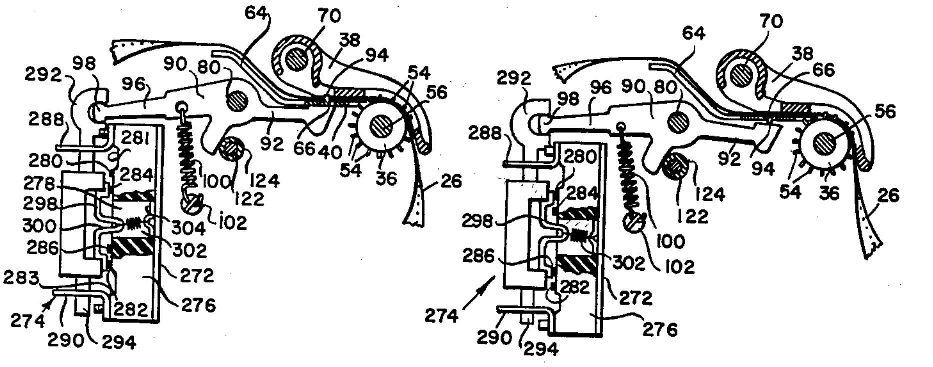
FIGURE 5 is an explanatory side elevation view illustrating a sensing lever and associated wiper type switch disposed in a "mark" signal condition.
FIGURE 6 is a view similar to FIGURE 5 illustrating the manner in which a common sleeve-like bail coacts with the sensing levers to shift them to a retract position, in which position associated switches will be disposed in a "space" signal condition.

Returning to FIGURE 3 and shown in clearer detail in FIGURE 5, it will be seen that sensing levers 90, all of which are similar, have a rightwardly extending arm 92, the end of which carries a vertical sensing pin 94 adapted to follow a path upon pivotal movement of the associated lever 90 which can permit projection of the pin 94 through an associated sensing pin hole 66 in the guide plate 40. The opposed leftwardly extending arm 96 of each lever 90 is a switch operating arm and terminates in an operating end 98 which cooperates with the actuating member of a two position switch 274 which will be fully described hereinafter. At an intermediate point on operating arm 96 a hole (see FIGURE 5) is provided for a sensing lever biasing spring 100, the opposite end of which is anchored at a suitable position on a spring anchor stud 102 extending forwardly from the vertical side plate 48. Each sensing lever 90 has its own individual biasing spring 100, and all sensing levers 90 are thereby biased in a counterclockwise direction which tends to place their sensing pins 94 in a position projected through the associated guide plate holes 66. In FIGURE 5 a short intermediate depending finger 104 is formed integral with each sensing lever 90 approximate its midpoint. These fingers 104 are utilized in providing simultaneous retraction of all sensing pins 94.

Figure 7:
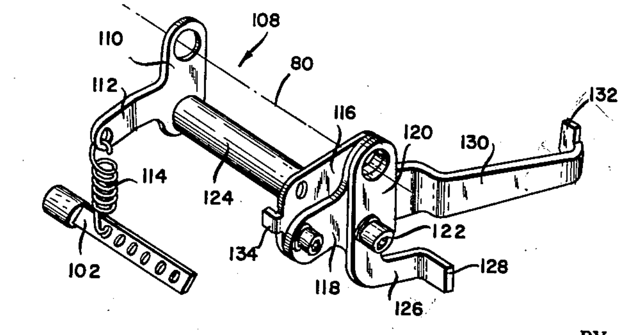
FIGURE 7 is an enlarged detail perspective illustrating the retracting carrier assembly for the sensing lever assembly.

Returning now to FIGURE 3 and also with specific reference to FIGURE 7, the mechanism 108 for retracting all sensing levers simultaneously will now be described. This retracting mechanism is a unitary assembly of several components rigidly secured together and pivotally hung on the same shaft 80 which mounts all sensing levers 90. At the rear as viewed in FIGURE 3, and clearly shown in FIGURE 7, there is a depending plate 110 having a horizontal short arm 112 to which is anchored a biasing spring 114, the other end of which is anchored on the aforedescribed anchoring stud 102. Closest to the viewer in FIGURE 3 and more clearly shown in FIGURE 7 are three plates 116, 118 and 120, all of which are pivotally disposed on shaft 80 and all of which are rigidly secured to each other and to the rearward spring arm plate 110 by means of a bolt 122 and an elongated cylindrical spacer sleeve 124 (the sensing lever retract bail) disposed vertically below the shaft 80. This assembly of the rear plate 110, the three forward plates 116, 118 and 120, the spacer sleeve 124 and bolt 122 mounted on the sensing lever shaft 80 provides the rigid unitarily pivotable sensing lever retracting mechanism 108.

The bolt 122 and spacer sleeve 124 are illustrated in the operational diagram of FIGURE 5 and it will be noted that all of the intermediate fingers 104 and all five sensing levers 90 rest on spacer sleeve 124, being biased into that position by the sensing lever biasing springs 100. With this arrangement in mind, it will be understood that clockwise pivotal movement of the just described retracting assembly 108 will simultaneously urge all sensing levers 90 in a clockwise direction to remove the sensing pins 94 to the position shown in FIGURE 6 down below the guide plate holes 66. This clockwise movement of the retracting assembly is made in opposition to the biasing force of its spring 114 and all sensing lever springs 100.

In FIGURES 3 and 7, the plate 120 closest to the viewer includes a depending arm 126 which is curved to the right and terminates in a bent end abutment 128. As will be described in the manual operational description hereinafter, this end abutment 128 is utilized in conjunction with manual retraction of all sensing pins and the registry lever 132 whenever it is desired to feed a tape into the machine and this specific lever abutment component 128 will not be referred to during the further description of the power operated components.

The plate 118 which is located immediately adjacent the front plate 120 consists of the feed wheel registry lever 130 which extends rightwardly in FIGURE 3, terminating in a bent end lug 132 which moves through a path, upon pivotal movement of the retracting assembly 108, enabling it to be disposed into cooperation with one of the notches in tape feed register wheel 60 to lock the feed roll 34 during a sensing period. The general arrangement between the registry lug 132 on the end of register lever 130 and its relationship with the register wheel 60 can be clearly seen in FIGURE 9 where the lug 132 is retracted out of registry position. This same register lever plate 118 also includes a short arm 133 which extends leftwardly (FIGURES 3 and 7) and provides means for additional rigidly secured relationship between plate 118 and the third plate 116 which is immediately adjacent plate 118. Plate 116 provides the means for power retraction of the sensing pins 94 and register lever 130 and to this end includes a bent finger 134 (see FIGURES 3, 4 and 7) serving as a combined latch and actuating abutment. Inasmuch as plate 116 is rigidly secured to plates 118 and 120, and thus is rigid with the retracting assembly 108, it is to be understood that the force exerted on the latch and actuator abutment 134, tending to rotate plate 116 in a clockwise direction, will pivot the entire sensing assembly 77 in that clockwise direction.

Figure 10:
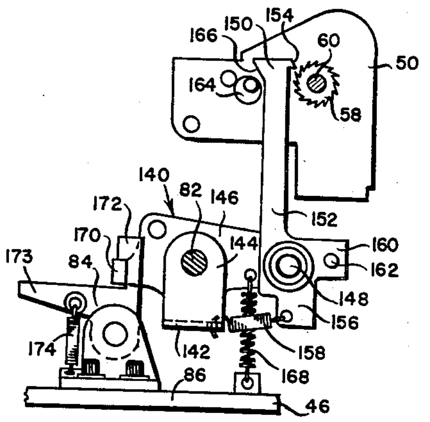
FIGURE 10 is an enlarged explanatory side elevation view of the tape feed mechanism illustrating the cocked position of the feed assembly (and pawl) which occurs upon energization of the power solenoid.
Figure 11:
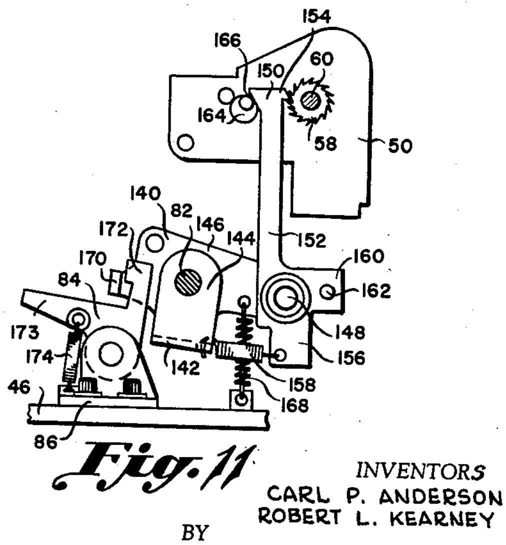
FIGURE 11 is a view similar to FIGURE 10 illustrating the tripped condition of the feed mechanism which occurs an instant prior to and triggers the release of the tape sensing assembly.

The second group of components, which is designated the tape feed group 78, includes the components seen in the lower right hand portion of FIGURE 3, supported on shaft 82. Most of these same components may be seen in enlarged operational detail in FIGURES 10 and 11 and are in perspective as the central group of components in FIGURE 8. This feed unit 78 is assembled on a one-piece lever component 140 which includes a feed lever arm 146. The carrier 140 is made of plate material and includes a U-shaped bridge 142 with an apertured front ear 144 and a coaxially rearwardly spaced apertured lever arm 146. The aforementioned feed shaft 82 is rigidly secured in the vertical side plate 48 and extends horizontally over the base plate 46 essentially vertically below the sensing pins 94. Shaft 82 projects through the apertured lever arm 146 and front ear 144 to provide pivotal mounting for the feed lever carrier member 140. Through use of suitable spacers, seen in FIGURE 8, the feed assembly 78 is maintained in a fixed axial position on shaft 82.

Shown in FIGURES 3 and 4, the lever arm 146 projects leftwardly and carries at its terminal end an eccentric pawl mounting stud 148. Pivotally carried on the mounting stud 148 is a flat elongated feed pawl 150, the upper arm 152 of which terminates on one edge thereof in a knife edge projection 154 disposed for upward ratcheting and downwardly directed drive movement in engagement with the peripheral teeth on ratchet wheel 58. A depending finger 156 below the pivotal mount of feed pawl 150 has connected thereto a feed pawl biasing spring 158, the opposite end of which is anchored to the feed lever bridge 142 thereby biasing feed pawl 150 so its knife edge 154 is urged into engagement with ratchet wheel 58. This will enable normal step feeding operation of the feed pawl whenever the feed lever 140 is oscillated about its shaft 82 to ratchet upwardly over the teeth of ratchet wheel 58 and to engage a tooth during downward shift to index the feed roll 34 one step.

At this point, we note that a short horizontal finger 160 adjacent the pivotal point of feed pawl 150 includes a stud 162 which is used in conjunction with the manual retraction, to be hereinafter described. Also used in conjunction with the manual retraction operation is a small eccentrically mounted cam 164 fastened to the facing side of the vertical feed roll mounting plate 50 adjacent the rear edge of feed pawl 150 which is formed with a short inclined abutment 166. Abutment 166 and the eccentrically mounted cam 164, which enables operative adjustment, are utilized during the manual retract and operative positioning through means of the control lever 24. The abutment 166 and cam 164 cooperate to positively assure that feed pawl 150 is forced into engagement with the ratchet wheel 50 whenever control lever 24 is moved out of retract position. Anchored to an intermediate point of the lever arm 146 is a biasing spring 168, the other end of which is anchored to the base plate 46 thereby tending to impart a constant biasing force on the feed assembly 78 in a clockwise direction, the step feeding direction during downward shifting movement of the feed pawl 150.

Figures 8, 9:
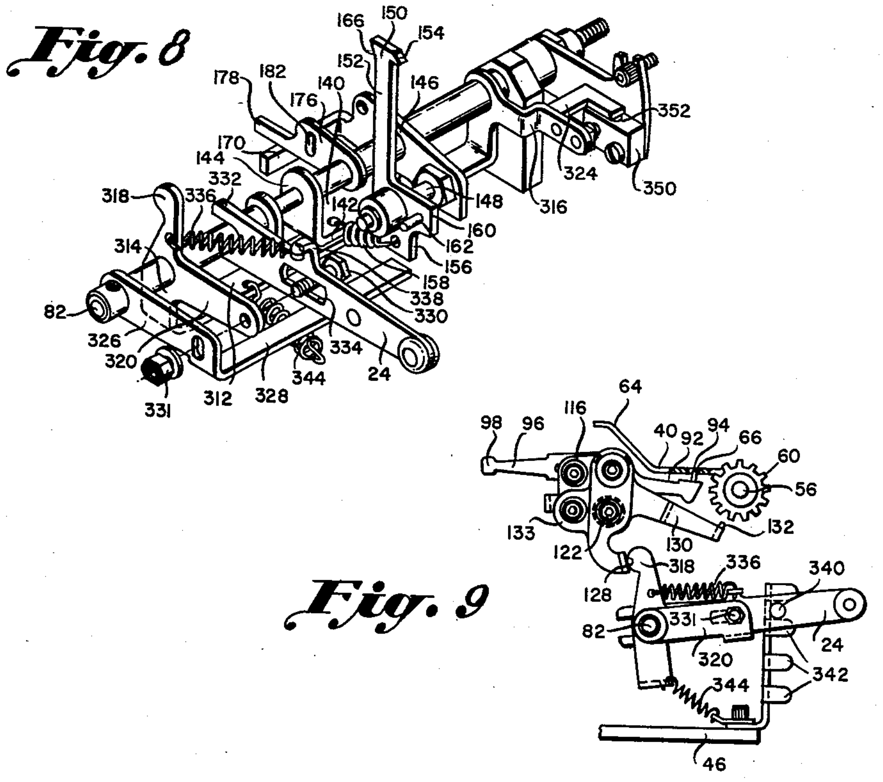
FIGURE 8 is an expanded perspective view in enlarged detail of the combined feed and trigger assembly and the manual control auxiliary assembly.
FIGURE 9 is an explanatory side elevation view illustrating the retract position of the sensing and tape registry components under manual control.

Shown in FIGURE 3, but more clearly illustrated at the rear center portion of FIGURE 8, is a horizontally extended bent arm 170 integral with lever arm 146 and disposed on the opposite side of its pivotal axis. This arm 170 serves a two-fold purpose. First, it provides an abutment for shifting of the feed assembly 78 by the power operator which, when energized, exerts a downward force tending to pivot the feed lever assembly 78 in a counterclockwise direction against the biasing force of its spring 168. Secondly, it serves as a latching abutment for cooperation with the hooked arm 172 of the aforedescribed feed latch lever 84 which, as illustrated in FIGURE 3, is biased counterclockwise by a biasing spring 174 toward a latching disposition. Note, FIGURE 3 illustrates the latched cooperation between feed latch lever 84 and the feed lever assembly 78 whereas FIGURE 4 illustrates the same two components in an unlatched condition. In the latched condition of FIGURE 3 where feed assembly 78 has been shifted counterclockwise and cocked, the feed pawl 150 is raised to the start position of a feed movement, and in the unlatched condition of FIGURE 4 where the feed lever assembly 78 has been tripped and pivotally shifted clockwise due to the biasing force of spring 168, the feed pawl 150 will have been shifted downwardly an amount sufficient to index the feed roll 34 one tape feed step.

Still looking at FIGURES 3 and 8, a small auxiliary lever plate 176 has one end apertured and mounted on the feed lever shaft 82 and has its opposite end 178 formed as a triggering extension 178 projecting above the bent latching arm 170 of feed lever unit 140. For purposes to become apparent as this description proceeds, lever 176 will be termed a sensing assembly trigger lever. Although it appears in FIGURE 8 that lever 176 is engaged by the bent latching arm 170, in fact, it is not; rather, this trigger lever 176 is rigidly secured to the feed lever arm 146 by means of the screw 180, seen in FIGURE 3, and thus will pivotally shift as a unitary part of the feed lever 140. The screw 180 which secures the trigger lever 176 to feed lever arm 146 passes through a slotted opening 182 in the trigger lever, enabling operational adjustment of the position of trigger lever 176 relative to feed lever arm 146.

While still viewing FIGURE 3, it is again noted that clockwise pivotal shifting of the sensing assembly 77 located above the feed lever assembly 78 can be accomplished by exerting force on the sensing assembly 77 at either of two locations, first, a leftwardly directed force against the end abutment 128 and, secondly, an upwardly directed force on the bottom of bent finger 134.

Figure 14:
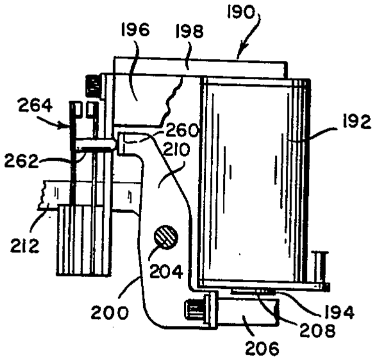
FIGURE 14 is an explanatory drawing of the solenoid frame switch which is operated, by movement of the armature when the coils are energized, to switch resistance in series with the coil enabling continuous solenoid energization.

The power assembly 79 will be described with primary reference to FIGURE 3 and secondary reference to FIGURES 2 and 14. This reader 20 has been designed to operate in conjunction with a conventional message center transmitter and operates on the demand principle, receiving impulse signals from the transmitter whenever such transmitter is ready for another code combination group. Furthermore, inasmuch as reader 20 is a simultaneous type of signal transmitter, there is no need for a time base power operation as in sequential transmissions.

Accordingly, reader 20 derives its operational power from an electro-magnet 190 consisting of one or two winding coils 192 surrounding a core element (or elements) 194. The electro-magnet 190 is mounted on a side support casting 196, made of non-magnetizable material, such as Phosphor bronze, and securely fastened to the vertical side plate 48 by means not shown. A bridging plate 198 made of magnetizable material is secured by screws to the upper end of casting 196 and provides a bridge flux circuit for the vertically disposed cores 194 with their winding coils 192. Casting 196 serves as a mount for several components of the power assembly 79, the primary component being the electro-magnet armature lever 200. Lever 200 has a vertically disposed intermediate portion 202 which is apertured and pivotally mounted on a shaft 204 which is horizontally fixed in the casting 196. Seen in FIGURE 3, the lower end of the armature lever 200 takes a dogleg jog leftwardly and has rigidly secured thereon an armature plate 206 disposed immediately below the pole faces 208 of the two magnet cores 194. Thus, energization of the winding coils 192 on electro-magnets 190 will attract armature plate 206, causing a resultant clockwise pivotal shift of armature lever 200. Armature lever 200 includes a second plate 210 secured thereto to operate in conjunction. The second plate 210 is used to operate a holding circuit switch, is shown in FIGURE 14 and has the lower arm formed in a manner similar to that of the main plate 202.

Returning to FIGURE 3, the upper arm 212 of armature lever 200 extends rightwardly with a dogleg jog to a position adjacent the sensing and feed assemblies 77 and 78, projecting through an opening formed in the casting 196. Heavy lateral portions 214 and 216 of casting 196 are located above and below the horizontal upper arm 212 of armature lever 200 and provide pads for armature limit stop adjustable abutment screws 218 and 220, the adjustable position of which can be secured by suitable lock screws.

Fastened on the lower end of casting 196 is a spring abutment plate 222 having a projection 224 on its upper surface forming a guide post for the abutment end of a compression spring 226. The upper end of compression spring 226 fits over a downwardly disposed projection 228 on the lower edge of the horizontal armature lever arm 212 and accordingly, compression spring 226 exerts a biasing force on armature lever 200, urging it to pivot in a counterclockwise direction to a limit position where the upper arm 212 abuts stop nut 218. Energization of the electro-magnet 190 pivots armature lever 200 clockwise until the upper horizontal armature lever arm 212 abuts the lower limit adjustment screw 220, at the same time compressing and storing operating power in the compression spring 226. Note the rate of movement of the armature lever during a complete cycle will depend solely on the energizing strength of electro-magnet 190 and the spring force of compression spring 226, and remains constant regardless of the over-all demand rate.

At the right hand end of the upper armature lever arm 212 (as seen in FIGURE 3) is located a pivot stud 232 and from this position, the right hand portion 230 of arm 212 projects downwardly and has an integral rigid horizontal finger 234 which extends over and engages the upper edge of the feed lever latching arm 170. At the extreme lower end of the armature lever's right end arm 230 is a horizontally bent portion 236, in which is secured an adjustable tripping stud 238. In assembled position, this tripping stud is located below the underside of the trip arm 273 of the feed latching lever 84. Counterclockwise pivotal movement of armature lever 200 will shift the tripping stud 238 under the force of its biasing spring 226 into engagement with the trip arm 173 of feed latching lever 84 to shift the latching lever 84 clockwise against the bias of its biasing spring 174 and shift the aforesaid hooked end 172 of latch lever 84 away from latching engagement over the feed lever latching arm 170. This trip of latch lever 84 will permit the feed lever assembly 78 to shift clockwise under the force of its biasing spring 168.

Clockwise movement of armature lever 200 under energization of the electro-magnet 190 will shift the armature lever finger 234 at its right hand end downwardly, which, because the finger 234 is in engagement with the feed lever latching arm 170, will force the feed lever assembly 78 to pivot counterclockwise against the force of its biasing spring 168. Since this clockwise movement of armature lever 200 also shifts the armature-carried tripping stud 238 away from engagement with the trip arm 173 of latch lever 84, the latch lever 84 is permitted to pivotally shift counterclockwise under the force of its biasing spring 174 enabling its hooked end 172 to shift to a latching disposition above the feed lever latching arm 170 as soon as the feed lever assembly is shifted a sufficient amount counterclockwise. Thus it will be seen that each time the latch lever 84 is tripped by upward movement of the tripping stud 238, the feed lever assembly 78 will be operated under the force of its biasing spring 168 to pull down on the feed pawl 150 indexing the feed roller 134 one step.

Movement of the armature lever 200 counterclockwise under the force of the compression spring 226 provides the power which shifts the sensing assembly 77 to a retract position. This transfer of force is accomplished by a combination L-shaped retracting and blocking lever 242 which, for convenience, will be referred to merely as the blocking lever. Blocking lever 242 includes a vertical arm 244 and a horizontal arm 246, is pivotally carried intermediate the two arms on the aforedescribed pivot stud 232 at the right hand end of the armature lever arm 212, and is spring-biased in a clockwise direction by means of a spring 248 anchored at one end on the horizontal arm 246 and at its other end to an anchor stud (not shown) on the vertical right end arm 230 of armature lever 200.

The upper end of the blocking lever vertical arm 244 includes a step notch 250 adapted, when the armature lever 200 is pivotally shifted its full extent clockwise by energization of solenoid 190, to snap into latching engagement with the bent latching finger 134 of the sensing assembly plate 216. In this latched position, which is illustrated in FIGURE 3, a bent lug 252 at the end of the blocking lever horizontal arm 246 is in engagement with the upper edge of the trigger extension 178 of trigger lever 176 in the feed lever assembly 78. Note that so long as the feed lever assembly 78 is latched by the latching lever 84, a counterclockwise pivotal shift of the armature lever 200 causes the blocking lever 242 to shift upwardly while its notched end 250 is still in a latched position with the sensing assembly latching finger 134. This movement causes a clockwise pivotal shift of the entire sensing assembly 77 which unblocks the register wheel of the feed roll 34 and also retracts all pins 94 of the sensing levers 90.

While the sensing lever assembly is moving to this retracted position, the tripping stud 238 on the end of the armature lever 200 has engaged the feed lever assembly latch 84, and gradually shifts to trip and release the feed lever assembly 78 to pivotally shift clockwise under the force of its biasing spring 168. The initial portion of clockwise shifting movement of the feed lever assembly 78 starts rotation of the tape feed roll 34 with immediate shifting movement of the tape 26. As the tape 26 starts to shift, the completed clockwise shifting movement of feed lever assembly 78 will move the trigger extension 178 of trigger lever 176 into engagement with the bent lug 252 on the horizontal arm 246 of the retract blocking lever 242 causing counterclockwise pivotal shift of blocking lever 242 against the force of its biasing spring 248 to remove the stepped end 250 from a blocking position under the sensing assembly latching finger 134.

The sensing lever assembly 77, thus being unlatched, will be shifted counterclockwise under the force of its biasing spring 114 to place the lug 132 of register lever 130 into one of the notches of the register wheel 60 which accurately positions the indexed stepping movement of tape 26.

This counterclockwise shift of the retracting assembly 108 also removes the spacer sleeve away from the intermediate fingers 104 of all sensing levers 90, permitting each sensing lever 90 to be independently shifted in a counterclockwise movement by its associated biasing spring 100. At this point in the operation, any hole of a group of code holes in the tape disposed immediately above the asssociated sensing holes 66 in the guide plate 40 will permit complete counterclockwise pivotal shift of the associated sensing levers 90. If no hole is located in the tape above a sensing hole 66 in guide plate 40 for an associated sensing lever pin 94, complete counterclockwise shift of that particular sensing lever 90 will be blocked.

The solenoid holding circuit will be described with reference to FIGURE 14 wherein the aforenoted second arm 210 of the armature lever 200 is illustrated with a horizontal lug 260 which, when the armature 200 is pivotally shifted under energization of the electro-magnet 190, will move into engagement with an actuator button 262 which opens the contacts of a holding circuit switch 264 secured on the electro-magnet casting 196. Switch 264 is located in the electrical power circuit to the winding coils 192 of electro-magnet 190 in parallel with a fixed resistance (not shown). Thus, whenever the magnet 190 is energized the switch 264 will be opened and the resistance, being in parallel with switch contacts, will decrease the current passing through winding coils 192. This shunt circuit through coils 192 enables the solenoid 190 to be energized indefinitely with a small holding current without becoming excessively overheated.

The energizing current for the electro-magnet 190 can be derived from the numbering pulse in existing transmitter-distributor but it could be derived from a shorter pulse and thus eliminate some of the source of overheating, which is one purpose of the holding circuit. However, besides eliminating overheating, the reduced current holding circuit fulfills other functions, a rapid release of the armature when the electro-magnet is de-energized and reduced inductive kickback in the circuit to prevent arcing and pitting of the control contacts in the demand component.

To transmit the information read from the punched tape 26 by the group of sensing levers 90, the end 98 (see FIGURES 5 and 6) of each operating arm 96 of each sensing lever 90 is pivotally interlocked with a U-shaped end 268 of a wiper switch actuator 270. There is a transmitting two-position wiper type switch 274 associated with each of the sensing levers 90 and all of these switches 274 are included in a unitary assembly integrated by a common backing plate 272, the backing plate 272 being secured by means such as screws to the vertical side plate 48 and extending under the operating arms 96 of all sensing levers 90. All of the switches 274 are identical and only one will be described in detail with reference to FIGURE 5.

A wiper switch 274 consists of a vertical dielectric block 276 (made, for example, from phenolic resin) having a through slot 278 intermediate its two ends. This phenolic block 276 is fastened to the backing plate 272 and on its free face disposed away from the backing plate 272 has a series of four printed contact surfaces, 280 being the uppermost contact surface and 282 being the lowermost contact surface. Each of the contact surfaces 280 and 282 is individual to each dielectric block 276 and has terminals which can be connected to electrical lines adjacent the recesses 281 and 283, seen in FIGURE 5. Immediately below the uppermost contact surface 280 is a further contact surface 284 which is bridged across all switches 274. Likewise, a further contact surface 286 is located immediately above the lowermost contact surface 282 and is bridged across all of the dielectric blocks 276. When this reader 20 is used in a polarized transmitting system, one of the bridging contacts 284 and 286 can be positive and the other negative. When the reader is used in a current and no current system, only one of the two bridging contacts will have current applied thereto, the other one being an open contact.

Secured by screws along the upper and lower edges of all dielectric blocks 276 are two comb type guide plates 288 and 290 having a series of slots formed therein. These guide plates 288 and 290 maintain the upper arm 292 and lower arm 294 of each switch actuator 296 in vertical sliding disposition. The central portion of each actuator 296 is made of dielectric material and carries a bent wire contact wiper 298. The wire wiper 298 has an intermediate bend 300 which serves as a spring anchor. The wiper 298 of each of switches 274 is biased independently by a spring 302 anchored at its opposite end to an insulated anchor 304 thereby biasing the wiper ends into firm engagement with the contact surfaces 280, 282, 284 or 286, which are printed circuits.

The aforedescribed U-shaped switch actuator ends 268 are integral with the upper ends of the upper arms 292 of switch actuators 296. Thus, depending upon the pivotal position of a sensing lever 90, the end 98 of its operating arm 96 will place the actuator 296 of an associated switch 274 in the position shown in FIGURE 5 or the position shown in FIGURE 6. In FIGURE 5 the wiper is disposed in a mark condition, i.e., a tape sensing pin 94 has sensed a code hole in the tape 26 and permitted complete counterclockwise biasing of the sensing lever 90 which shifts the switch actuator 296 to its downward position. In this position, as clearly shown in FIGURE 5, the wire wiper 298 will bridge the individual lowermost contact 282 with the common bridging contact 284 providing a "mark" signal circuit from the common contact 284 to the lowermost contact 282 of the associated individual switch 274. On the other hand, should the tape sensing lever be biased so its sensing pin 94 engages a solid portion of the tape 26 instead of a code hole in the tape, the end 98 of operating arm 96 of the associated sensing lever 90 will remain in the upper position maintaining the U-shaped end 268 of switch actuator 296 in the upper position, shown in FIGURE 6, wherein the wire wiper 298 makes a bridging circuit between the uppermost contact surface 280 and the bridging contact 286 providing a "space" signal circuit through the individual uppermost contact 280. Since all of these sensing levers 90 are operated simultaneously, there will be a simultaneous switching circuit set up on the bank of transmitting switches 274. As will be described in the operational section of this description, a signaling pulse passed through all of these simultaneously set switch circuits will impart a simultaneous permutated group of electrical signal pulses to the message center transmitter.

*Controls*

The return control switch 22, previously briefly described as being located on the right front of the rerun reader 20 (FIGURES 1 and 2) is a three-position switch controlling two possible modes of operation of a rerun reader, the "pullback" and the "retransmission" modes of operation. The third position of switch 22 is "Off" which opens the operating control circuit of the rerun reader 20. The rerun reader 20 functions the same mechanically whether operating in either the pullback or the retransmission mode. In other words, in both modes a simultaneous signal circuit connects between the reader and transmitter, an identical power and switching control circuit exists between reader and transmitter, and a monitor tape from a previously transmitted message feeds into the reader (see FIGURES 15 and 16). Switch 22 merely controls the manner in which the reader 20 is placed into the specific system for accomplishing the desired mode of system operation.

Also, as was generally mentioned at the start of this description, the rerun reader 20 is equipped with a three-position manual control lever 24, the three positions being "start," "stop" and "retract" (FIGURES 1 and 2). The "start" and "stop" positions are obvious in that they control starting and stopping the rerun reader 20 by closing or opening a switch in the operating control circuit. The third, or "retract," position of lever 24 mechanically blocks the operation of reader 20, withdraws the sensing pins 94 from the tape 26 and frees the feed roll 34 to enable a tape threading operation.

Control lever 24 is the operating arm for an auxiliary group of components which can be designated the manual control assembly 310 which is mounted for limited pivotal shift on the feed lever mounting shaft 82. Some of the components of the manual control assembly 310 can be seen in the FIGURE 2 perspective view. However, with reference to the exploded detail perspective of FIGURE 8, all of the individual components of the manual control assembly 310 are illustrated, some being disposed on shaft 82 to the left side of the feed lever assembly 78 and others of the manual control assembly being located on the right hand side of the feed lever assembly.

The basic component of the manual control assembly 310 is a bridge member 312, the two ends of which are bent upwardly and apertured to be pivotally disposed on shaft 82. Note that in FIGURE 8, the left hand apertured end 314 includes two lever arms, a vertical arm 318, designated a sensing pin retracting lever arm, and a horizontal arm 320 which constitutes an extension for the control lever 24. The extreme right hand end 316 of the bridge 312 includes a horizontal arm 322 which carries a switch actuating finger 324. Also pivotally mounted on the shaft 82, and seen in exploded FIGURE 8 just to the left of the bridge end 314, is a feed pawl retracting lever 326. Lever 326 extends horizontally adjacent the horizontal arm 320 of the assembly bridge 312 and terminates in an elongate bent tab 328 extending below the control lever 24, so the end of the bent tab 328 is disposed below the feed pawl retracting stud 162, previously described as being located in the lower horizontal finger 160 of the feed pawl 150. The control lever 24, the end of which projects from the front of the reader 20, is disposed immediately on the right hand side of the horizontal arm 322 of bridge member 312 and has its other end cooperating with the shaft 82. By means of a shouldered bolt 330 and lock nut 331, lever 24 is secured to the horizontal bridge arm 320 and the feed pawl retracting lever 326 so that all three of these components constitute the unitary pivotable manual control assembly 310.

Control lever 24 also serves as a latching means to maintain the manual control assembly 310 in any of its three positions. To enable this latching function of control lever 24, end 332 which cooperates with shaft 82 is forked and the aperture 334 which cooperates with the shouldered shank of bolt 330 is a radial slot disposed lengthwise of lever 24. A tension spring 336 is connected between an ear 338 on the control lever 24 and the vertical retract arm 318 on the left hand end 314 of bridge 312 and creates a bias force urging the retract lever 24 toward the shaft 82. Thus, the slotted aperture 334 and forked end 332 allow the spring biased control lever 24 to be manual shifted within a limited range in a substantially horizontal path.

Securely staked in the forwardly projecting end of control lever 24 is a stop pin 340 which extends laterally so its vertical path of movement intersects a group of forwardly projecting positioning bars 342, seen in FIGURES 1, 2 and 9. In any of the three possible positions of control lever 24, the stop pin 340 will be disposed between two of the positioning bars 342 being so urged by the biasing force of spring 336. An additional tension spring 344 attached between the lower bridge of bridge member 312 and an anchor on the base plate 46 will ably assist the spring 336 in securely positioning the control lever 24 in whichever one of the three different positions it is placed by manual manipulation.

Movement of manual control lever 24 between the intermediate "stop" position and the lowermost "start" position results only in actuation of a main start-stop switch 350. Again viewing FIGURE 8, the aforedescribed switch actuating finger 324 on the right hand end 316 of the manual control assembly bridge 312 is disposed immediately above an actuating plunger 352 of the main start- stop switch 350. With control lever 24 in the intermediate position ("stop"), the switch actuating finger 324 will not depress the main start-stop switch actuating plunger 352 and accordingly, the main switch 350 is conditioned to open the operating control circuit between the tape reader 20 and associated switching center equipment and also close a second circuit to continuously energize the electro-magnet 190 which places the rerun reader in a "stop" position.

Movement of manual control lever 24 further downwardly to the "start" position will pivot the manual control assembly 310 clockwise which lowers the switch actuating finger 324 to depress the main switch actuating plunger 352. Depression of this plunger opens the electro-magnet holding circuit and closes the operating control circuit placing tape reader 20 under control of associated switching equipment.

The mechanical control aspects of the manual control assembly 310 come into action when control lever 24 is shifted upwardly to the "retract" position. As has been noted, the control lever 24 is securely fastened to the bridge which contains vertical retract lever 318 and also is securely fastened to the feed pawl retracting lever 326, thus when control lever 24 is moved to its upward "retract" position, the entire manual control assembly 310 is pivotally shifted in a counterclockwise direction. This movement shifts the bent tab 328 of feed pawl retracting lever 326 upwardly, engaging the aforenoted stud 162 on tape feed pawl 150 to pivot the feed pawl 150 counterclockwise against the force of its biasing spring 158 and moving the pawl knife edge 154 out of engagement with the tape feed roll ratchet wheel 58, thus releasing the feed roll 34 for free rotation, enabling ease of inserting a tape into the reader 20.

It will be recalled that the tape feed lever 140 pivotally carries the feed pawl 150 and that the tape feed lever 140 also rigidly mounts the trigger lever 176. Momentarily viewing FIGURE 11, it will be realized that an upwardly directed force on the feed pawl stud 162 results in the aforenoted counterclockwise pivotal movement of the feed pawl 150 to move it away from the ratchet wheel 58. However, the back edge of the feed pawl engages the eccentric abutment 166 upon a slight counterclockwise rotation of the feed pawl 150 and limits counterclockwise pivoting of the feed pawl. In effect, this results in a rigid connection between the feed pawl and the feed lever arm 146 whereby continued upward force on the stud 162 will start shifting the entire feed assembly 78 in a counterclockwise direction which moves the triggering extension 178 counterclockwise away from engagement with the horizontal arm 246 of the retract blocking lever 242 permitting blocking lever 242 the necessary freedom to pivot clockwise under urging by its biasing spring 248. This freeing of the blocking lever 242 enables it to shift to a latched position with the end abutment 128 of the sensing assembly latching arm 126 when the sensing assembly 77 is shifted to a sensing lever retract position, as will be now described.

At the same time, and occasioned by the same counterclockwise pivotal movement of the manual control assembly 310, the vertical retract lever arm 318 on bridge 312 (see FIGURE 9) abuts the bent finger 134 which depends from the sensing assembly 77, creating a clockwise pivotal movement to the entire sensing assembly 77. As has been previously described, clockwise movement of sensing assembly 77 will move the tape register lever 130 down and out of engagement with the tape register wheel 60 which, being located on the same shaft 56 as feed roll 34, permits freedom of rotation of the feed roll.

Continued clockwise movement of the sensing assembly 77 shifts the aforenoted end abutment 128 of the sensing assembly latching arm 126 upwardly so the notched end 250 of the blocking lever 242 under bias force of spring 248 shifts clockwise into a latched condition with the sensing assembly latching arm 134.

The aforenoted clockwise movement of the sensing assembly 77, as has been described, shifts the five sensing levers 90 clockwise to lower their sensing pins 94 down below the surface of guide plate 40. This movement of the sensing levers 90 simultaneously shifts all of the transmitting switch actuators 270 upwardly, moving their contact wipers 298 to make a circuit through all of the "space" contacts 280.

Figure 12:
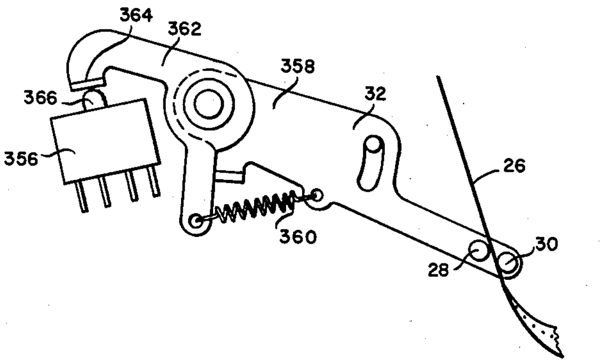
FIGURE 12 is an explanatory side elevation of the tight tape mechanism including switch and operating lever.

With the manual control lever 24 in the aforedescribed "retract" position, the reader 20 can be loaded with tape 26. Incoming tape 26 is fed between the pins 28 and 30 of the aforedescribed tight tape lever 32 and thence on up to the feed sprocket 58. The tight tape lever 32 (FIGURE 12), in a normal unoperated position, coacts with a tight tape switch 356 in a manner permitting the switch 356 to be internally biased to a normal position in which one pair of contacts are closed and disposed in series with the operating control circuit going through the closed contacts ("start" position) of the main start-stop switch 350. When the tape becomes tight, coaction between the tape and pins 28 and 30 will create a counterclockwise force on the right hand portion 358 of tight tape lever 32 urging it upwardly against the biasing force of tension spring 360 which resiliently interconnects the right hand portion 358 with the left hand actuating portion 362. Portion 362 is pivotally secured to portion 358 and also has a tight tape switch operating finger 364 coacting with the switch plunger 366. This counterclockwise pivotal movement of tight tape lever 330 forces the actuating finger 364 downwardly against the plunger 366 which, in turn, opens the operating control circuit through the main start-stop switch 350 and closes a second circuit to the switching equipment energizing solenoid electro-magnet 190, thus stopping the rerun reader 20.

Figure 13:
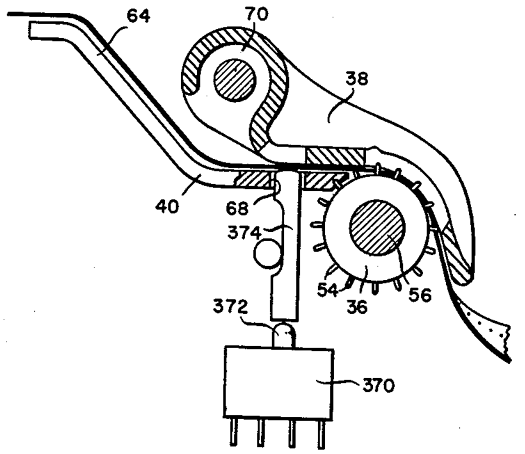
FIGURE 13 is an explanatory side elevation view of the end of message mechanism showing the relationship of its switch and operating pin to the tape guide structure.

FIGURE 13 illustrates still another safety switch 370, an end-of-message switch. This switch 370 is disposed below the tape guide plate 40 and has a vertical operating plunger 372 coacting with a vertical tape actuated switch pin 374, the upper end of which projects into the aforedescribed guide hole 68 in tape guide plate 40 under the path of message tape 26. Turning to FIGURE 2, the projected end of switch pin 374 can be seen in a position extended above the upper surface of guide plate 40 just to the left of the aligned sensing pins 94. Whenever a tape is in position on the guide plate 40, the tape 26 will hold switch pin 374 down so its upper tip is coextensive with the upper surface of the guide plate 40 and, in turn, the switch pin 374 forces the end-of-message switch plunger 372 downwardly against the bias of the internal spring in the end-of-message switch 370. In such a position, a series control of the operating control circuit through the main start-stop switch 350 to the switching equipment, is maintained in circuit closed position. However, when an end of the tape 26 has passed away from the switch pin 374, the switch plunger 372 pushes upwardly opening the series control circuit to the switching equipment and stopping the rerun reader 20.

*Operation*

The initial step in operating the rerun reader 20 is the proper setting of the switches 22 and 350 located on the reader which conditions the reader 20 to transmit the message.

The rerun control switch 22 is placed in desired operating position, either pullback operation or retransmission operation, which have previously been explained, and the three-position control lever 24 is placed in "retract" position to withdraw the sensing pins 94 and free the feed roll 34 during the tape threading operation.

Before threading tape 26 into the reader 20, tape lid latch 74 is depressed, releasing the tape lid 38 which, under spring tension, will pivot upwardly away from the tape guide plate 40. The tape 26 can now be threaded into the reader.

When control lever 24 is shifted to the "retract" position as it must be before tape 26 can be fed into the reader, the manual control assembly 310 pivots counterclockwise and the bent extension tab 328 (FIGURE 8) on the feed pawl retract lever 326 engages stud 162 on tape feed pawl 150, moving the pawl edge 154 out of engagement with the tape feed ratchet 58.

As the feed pawl retract lever 326 continues to move counterclockwise, the rear edge 164 of tape feed pawl 150 hits the abutment 166 and the trigger extension 178 attached to tape feed lever 140 shifts counterclockwise to release the end 246 of blocking lever 242 so that the blocking lever 242 is free to move clockwise under bias by its spring 248 to enable subsequent latching with the restore lever latch end 134 attached to the sensing lever assembly 77, as has been described.

During the same counterclockwise movement of manual control assembly 310, the sensing pin retract lever 318 engages the bent finger 134 on the sensing lever assembly, moving the sensing assembly 77 clockwise. This clockwise movement moves the tape register lever 130 down and out of engagement with the tape register wheel 60 allowing freedom of rotation to the feed roller 34.

As the tape feed roller 34 is freed, the sensing assembly latch end abutment 134, moving clockwise with the sensing assembly 77, shifts up to a position which unblocks the notched end 250 of blocking lever 242 which, being biased by its spring 248, moves into a latched condition with the sensing assembly 77 (FIGURES 3 and 4).

The clockwise movement of the sensing lever assembly 77 has, during this time, caused the sensing assembly spacer bail 124 (FIGURE 6) attached thereto, to engage the lower extensions 104 of the five sensing levers 90 forcing them to move clockwise to lower or retract the sensing pins 94 down below the surface of tape guide plate 40. As the sensing pin 94 move downward clockwise, the opposite ends 98 of all sensing levers 90 move upward and, being interlocked with wiper actuators 270 of wiper switches 274, cause all of the contact wipers 298 to move to the "space" contacts 280.

The sensing pins 94 are now maintained below the surface of tape guide plate 40 and the reader 20 is ready to receive tape 26 which is fed between pins 28 and 30 of the tight tape lever 32 and to the feed sprocket 36. So long as the tight tape lever 32 remains in the normal unoperated position, the tight tape switch contacts, in series with the operating control circuit through the closed contacts ("start" position) of the main start-stop switch 350 (FIGURE 3), are closed.

The tape 26 is threaded on up under the tape lid 38 and when the first character group of punched holes to be transmitted is properly aligned with the arow 76 (FIGURE 1) on the tape lid 38, the tape lid 38 is closed and latched, and the reader 20 is ready to transmit when the control lever 24 is shifted to "start," whereupon the reader will commence operation as demanded by a transmitter.

To lower the control lever 24 to "start" (or to any position, it must first be pulled outwardly to disengage stop pin 340 from between positioning bars 342 (see FIGURE 9). Spring 336 (see FIGURE 8) biases control lever 24 inwardly when it is released, thus securely holding stop pin 340 between two of the positioning bars 342.

When the control lever 24 is placed in the "start" position, the start-stop switch actuating finger 324 attached to the right hand end 316 of the manual control assembly bridge 312 shifts downwardly to actuate the main start-stop switch 350 to open the solenoid holding circuit that formerly was closed and to close the operating control circuit, placing the tape reader 20 under the control of the transmitter of associated switching equipment.

The downward movement of control lever 24, when placed in the "start" position, will shift extension tab 328 on the feed pawl retract lever 326 (FIGURE 3) clockwise, unblocking the stud 162 on tape feed pawl 150 causing tape feed lever spring 168 to instantly pull tape feed knife edge 154 into engagement with tape feed ratchet 58. Tape feed lever 140 to which tape feed pawl 150 is attached also moves clockwise urged by tape feed lever spring 168, and the trigger extension 178 attached to the tape feed lever 140 shifts clockwise to strike the lower end 246 of the sensing assembly blocking lever 242, triggering lever 242 against its spring bias in a counterclockwise direction. This counterclockwise motion of blocking lever 242 shifts the lever latching end 250 away from latched engagement with the sensing assembly latch abutment 134, causing the sensing assembly 77 to be tripped and shifted counterclockwise under spring bias to the position in FIGURE 4. It should be noted that, instantaneously with the above described action, the pin retract lever arm 318 has been moved clockwise away from extension finger 128 of the sensing assembly 77 so that the sensing assembly tripping operation can take place.

As the sensing assembly 77 is tripped, it instantly pivots counterclockwise on shaft 80, biased by spring 114. Spring 114 receives some assistance from the five sensing lever springs 100 which also instantly pull the sensing levers 90 counterclockwise due to their being unblocked when the sensing assembly spacer sleeve bail 124 moves counterclockwise and away from the lower extensions 104 of sensing levers 90.

In the final instant of the counterclockwise rotation of the sensing lever assembly 77, tape register lever 130 moves counterclockwise and again engages the tape register wheel 60 locking the tape feed roller 34 with sprocket 58. The tape 26 will now be in register with the rerun reader 20, and the rerun reader 20 is ready to receive the first electrical signal impulse from the transmitter that will set the reader in operation.

The mechanical force to operate the rerun reader is supplied entirely by the electro-magnet or solenoid 190, which is energized by the operating control circuits provided by the switching equipment, and will be explained with reference to FIGURE 3.

When the solenoid 190 is energized (normal waiting condition), core 194 attracts armature plate 206 and pivots the armature lever assembly 200 clockwise, compressing main power spring 226 which stores energy required to operate the rerun reader upon receipt of the transmitter impulse signal which opens the holding circuit whereupon the solenoid 190 is de-energized.

As the armature lever assembly 200 rotates clockwise by energized solenoid condition, the magnet frame switch 264 (FIGURE 14) is opened and a resistance in parallel with the switch contacts decreases the current in the solenoid 190. Solenoid 190 can then be energized indefinitely with this decreased holding current.

During clockwise pivotal shift, the extension finger 234 on the armature lever arm 230 moves against extension arm 170 of tape feed lever 140, moving lever 140 in a counterclockwise direction. Tripping stud 238 attached to the armature lever assembly 200 is thus moved away from depending leg 173 of the tape feed latch 84 and, urged by latch spring 174, the tape feed latch 84 will pivot counterclockwise to latch its hook end 172 over the extension finger 170 of tape feed lever 140.

Simultaneously, the counterclockwise pivoting of the tape feed lever 140 shifts the tape feed pawl 150 upward and disengages its knife edge 154 from tape feed roll ratchet 58.

An instant later, the blocking lever 242, now released by the downwardly shifted feed lever trigger extension 178, moves down with the armature lever assembly 200 and pivoting on stud 232, under force of its biasing spring, latches its notched end 250 with the sensing assembly latch abutment 134.

At this point solenoid 190 is de-energized by the control signal impulse from the demand transmitting circuit and the armature lever assembly 200 moves counterclockwise biased by armature compression spring 226.

With the blocking lever 242 remaining in its latched condition (FIGURE 3), the armature lever assembly 200 being urged counterclockwise by spring force moves the tripping stud 238 upward, in turn, forcing leg 173 of tape feed latch 84 upward to start the eventual release of extension arm 170 of tape feed lever 140.

Continuation of the spring biased counterclockwise pivotal movement of the armature lever assembly 200 shifts the blocking lever 142, still latched under the sensing assembly latch abutment 134, in an upward direction forcing the sensing assembly 77 to pivot in a clockwise direction. This action shifts the sensing lever spacer sleeve 124 against the depending fingers 104 of the sensing levers 90 to pivot the sensing levers and move the sensing pins 94 down below the surface of the tape guide plate 40 (see pin position in FIGURE 6).

Because the opposite ends 98 of sensing levers 90 are interlocked with the associated switch wiper actuators 296, when all of the sensing levers 90 pivot clockwise, all associated contact wipers 298 are moved upward to the "space" contacts 280.

Instantaneously with this pin retracting action, the tape register lever 130 moves clockwise and out of engagement with the tape register wheel 60, and a fractional instant later, the tape feed pawl 150 attached to tape feed lever 140 (which at this instant is completely released by unlatching of feed lever latch 84) snaps downward urged by tape feed lever spring 168, engaging a tooth on tape feed ratchet 58 which, being mounted on the same shaft 56 with the tape feed roll 34 and sprocket 36, causes tape 26 to be indexed one step to the next code position.

An instant after this tape feed action, the end of trigger extension 178 (moving with the feed lever 140) snaps clockwise against end 246 of the sensing assembly blocking lever 242, triggering it in a counterclockwise direction to trip the sensing lever assembly 77 (see FIGURE 4). Now being completely unlatched, the spring biased sensing lever assembly 77 instantly rotates counterclockwise, returning the tape register lever 130 back into engagement with the tape register wheel 60, and instantaneously with this registery movement, the restore lever spacer sleeve 124 unblocks the depending fingers 104 of sensing levers 90 allowing them to pivot counterclockwise under independent spring bias to urge the sensing pins 14 upward through the guide plate holes 66.

If a hole is present in tape 26 above an associated sensing lever 90, that sensing lever 90 will continue to rotate counterclockwise urged by spring 100 until it strikes the tape lid 38. When the pin 94 of a sensing lever 90 passes through a hole in the tape, the opposite end 98 of that lever 90 being interlocked with the associated switch wiper actuator 296 will shift to a position which slides the associated contact wiper 298 down to the "mark" contact 282 of that switch and a "mark" circuit is immediately set up through the printed switch circuits of all such wipers in the "mark" position.

If no hole is present in the tape 26 above any specific sensing pin 94, counterclockwise movement of the sensing lever 90 connected with that pin 94 is blocked by the sensing pin 94 hitting the tape 26. Consequently, the contact wiper 298 associated with such a blocked sensing lever 90 is held on the "space" contact 280. In this manner a spacing circuit is set up through the printed switch circuits of all such wipers retained in the "space" position. The printed circuit of the group of switches 274 is then pulsed by the associated transmitting equipment to transmit the sensed code group simultaneously.

Solenoid 190 again becomes energized and the rerun reader 20 will again be prepared (or cocked) for the next code group reading cycle.

When the demand transmitting reader 20 is used as a rerun reader in a central telegraphic switching center, as has been previously discussed, it will be used in a combinational organization with other standard switching center components, e.g., (see FIGURES 15 and 16) a monitor reperforator 410, a transmitter-distributor 420, a tape perforator 430 and a manual forwarding unit 440 (conventionally a tape reader with sequential transmission components). With such other switching center units wired in proper circuitry with the re-reader control switch 22, two modes of re-reading operation are enabled, "pullback" and "retransmission," in each of which the message tape 26 is taken from the storage drum of the monitor reperforator 410.

In the "pullback" operation (FIGURE 15), a rerun-message tape 26 from monitor reperforator 410 is inserted into the rerun reader 20 and when the proper switches on the transmitter-distributor 420 are put into operation, the monitor transmitter-distributor 420 operates and opens a pulsing contact in the rerun reader operating control circuit. The reader 20 then starts to operate, transmitting the first code group on the tape 26 to the monitor transmitter-distributor 420 in the form of simultaneous teletypewriter code. This simultaneous code is converted into sequential code in and is transmitted by the transmitter-distributor 420 directly to the signal line 450 associated with that monitor position. At this time, operation of the monitor reperforator 410 is locked out, preventing the re-punching of the "pullback" message by the monitor reperforator.

In the "retransmission" operation (FIGURE 16), the rerun tape 26 from monitor reperforator 410 is inserted into the rerun reader 20 and when the proper switches on the transmitter-distributor 420 are put into operation, the necessary circuits between the rerun reader 20 and the transmitter-distributor 420 are set up. If the controls on the retransmission control box (not shown) are properly positioned and the sending teletypewriter set 425 is free to receive the transmission, the transmitter-distributor 420 starts operating to open a set of pulsing contacts in the operating control circuit to the solenoid 190 of the rerun reader 20. Opening this operating control circuit causes the tape reader 20 to transmit the first code group on the tape 26 to the transmitter-distributor 420 in the form of simultaneous teletypewriter code. The transmitter-distributor 420 converts the simultaneous code into sequential code and this, in turn, is transmitted to the perforator 430 of the teletypewriter set 425. The perforator 430 punches a new tape 436 containing the retransmission message and an operator then processes the tape 436 manually and transmits it to the signal line 450 through a manual forwarding unit 440. As the retransmission message is transmitted from the manual forwarding unit 440, a new monitor copy of the message is made on the monitor reperforator 410. In both modes of operation the rerun reader is controlled by demand from the sequential transmitter 420.

The tape reader which has been fully described hereinbefore utilizes as its power source the electro-magnet 190 and compression spring 226 in lieu of a more expensive rotary electric motor (internal or external) as is the case with conventional tape readers. This organization, of course, results in a less expensive and more compact unit, but over and above such immediately apparent advantages, the use of an electro-magnet and a spring provides a device wherein all operating components, i.e., the armature lever, the feed mechanism, the sensing mechanism, latches, abutments, etc., will be shifted during a cycle of cocking, retraction, release and sensing at a rate which depends solely on the amount of energizing current initially imparted to the electro-magnet to attract and move the armature lever and upon the release force stored in the armature lever compression spring. The rate and force of movement of all components in this reader stay the same within a single cycle of operation whether the demand rate of machine reading operation is for one word per minute, 100 words per minute or 200 words per minute.

Thus, an increase in the over-all reading rate of the present machine will not result in an increase of the intercycle rate of movement and transfer of forces between components, whereas in previously known fixed time base tape readers having a motor driven cam power source, an increase in over-all machine reading rate is obtained by increasing cam speed accomplished either by changing gears or increasing motor speed. In the previously known tape readers this increased reading rate results in higher intercycle velocities of component movements and high impact forces between components, thus increasing wear and tear on components per cycle of operation as compared to the wear and tear on the same components per cycle during lower over-all reading rates.

This intercycle operational rate of components, in previously known machines, will result in decreased over-all sending life. In other words, merely as an example, if a previous type machine can operate at a rate of 100 w.p.m. for 1,000 hours, when the operating rate is increased to 200 w.p.m., it will not operate for 500 hours but due to the increased intercycle wear of components, will only operate for, say, 200 hours.

In distinction to such operation of previously known tape readers, the reader of this present invention will have a substantially fixed over-all sending life. In other words, as an example, if the machine life is 1,000 hours at a rate of 100 w.p.m., it will be 500 hours at a rate of 200 w.p.m., and this is due to the structural and functional relationship between components which provides a fixed intercycle wear on components.

Still another advantageous factor which results from the fixed intercycle rate of movement and force on machine components is that the intercycle tape stepping force and velocity is always the same regardless of cycle frequency. Previously known readers increase the intercycle tape stepping force and rate of movement, causing distortion of feed holes in the tape and this distortion can become excessive and troublesome at high rates of machine speed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A message tape reading machine comprising: sensing and switching devices adapted to sense a combination code representation appearing on a message tape and to condition transmitting circuits for transmitting corresponding simultaneous electrical code signal impulses to an associated data processing device; means for step feeding the message tape; and self-contained, demand type, cyclic power operating means having a cyclically oscillatable device including means adapted to coact with said tape feed means and said sensing and switching devices to provide a cycle of tape indexing and reading operation upon receipt of a demand signal from the data processing device.

2. The tape reading machine as defined in claim 1, wherein the data processing device is an associated transmitter; said power means includes a solenoid, spring biased to de-energized position; and electrical control circuitry connects said transmitter and said solenoid enabling said power means to be operated through a reading cycle upon receipt of a demand signal from said transmitter through said circuitry.

3. A punched code message tape rerun reader comprising: a plurality of two-position switching circuits; shiftable sensing and switching devices cooperating with said switching circuits and adapted to sense a combination punched hole code representation appearing on a message tape and to condition transmitting circuits through said switching circuits for transmitting corresponding simultaneous electrical code signal impulses to an associated data processing device; means for step feeding the message tape; a combination solenoid and spring biased, demand type, cyclic power operating means having a cyclically oscillatable device including means adapted to coact with said tape feed means and said sensing and switching devices to provide a cycle of tape indexing and reading operation upon receipt of a demand signal impulse from the data processing device; and a control circuit for said solenoid; the normal operating condition of said power operating means being energization of said solenoid through said control circuit against spring bias, and said demand signal impulse resulting from an open condition of said solenoid control circuit.

4. A rerun reader as defined in claim 3, wherein a manual retract means has a member adapted to engage and shift said sensing and switching devices to a retracted position, a member to engage, shift and disable said means for step feeding the message tape, and a switching member to disrupt said solenoid control circuit.

5. A coded tape reader and simultaneous code impulse transmission switching device having a self-contained power device; and tape code sensing, switching and feed means adapted to be cyclically engaged and operated at random machine reading speeds by said power device under the control of demand electrical input signal impulses by a mechanism adapted to be connected to receive coded transmission through this device.

6. A coded tape reader and simultaneous code impulse transmission switching device having a self-contained spring biased solenoid power device with an oscillatable means; tape code sensing, switching and feed means adapted to be cyclically engaged and operated at random rates of machine reading speeds by said oscillatable means; and circuitry means controlling energization of said solenoid against spring bias whereby demand electrical signal impulses impressed in said circuitry means by a mechanism which can receive coded transmission through this device will control each cycle of reader operation; said spring biased power device providing an intercycle force and rate of movement of said oscillatable means which is invariable regardless of change in the demand rate of machine reading speed.

7. A telegraphic tape reader for reading punched code holes in a message tape comprising: a tape sensing station; three major subassemblies; a first of said subassemblies being a spring biased tape sensing and switch selecting device including pivotable mounting means enabling shifting movement between tape sensing and nonsensing conditions at said sensing station; the second of said subassemblies being a spring biased shiftable mechanism for accomplishing tape feed and for triggering and permitting pivotal shift of said sensing and switch selecting device to a tape sensing position; a means adapted to shift and latch said second subassembly in a cocked position against spring bias; and the third of said subassemblies consisting of a cyclically oscillatory power device having means adapted to latch with and shift said tape sensing and switch selecting device to a non-sensing position against spring bias, and means for shifting said second subassembly to its cocked position and subsequently tripping said means which is adapted to latch said second subassembly.

8. A tape reader as defined in claim 7, wherein a shiftable manual retracting assembly is provided in adjacent disposition to said second assembly and includes a device to engage, shift and retain said second assembly to its cocked position and to disable tape feed, an arm adapted upon shifting movement to engage, pivotally shift and retain said sensing and switch selecting device to a retracted non-sensing position, and a means to disable said power device.

9. A tape reader as defined in claim 8, wherein said power device includes a spring loaded solenoid, a control circuitry is provided for said solenoid, said means to disable said power device comprises switching means in said control circuitry and an operating lever in said retracting assembly adapted to actuate said switching means.

10. A tape reader as defined in claim 9, including an end-of-tape switching means and a tight-tape switching means both of which are included in said control circuitry to respectively disable said power device whenever either an end-of-tape condition and a tight-tape condition occurs, an end-of-tape sensing means is provided at said tape sensing station in control connection with said end-of tape switching means, and a tight-tape sensing device is provided adapted to engage incoming message tape and in control connection with said tight-tape switching means.

11. The tape reader as defined in claim 7, wherein a tape guide device provided at said tape sensing station consists of a flat guide plate having a lateral series of sensing pin holes therethrough; a rotatable sprocket pin tape feed roller device is disposed on a horizontal axis immediately in front of said guide plate including a ratchet feed wheel integrally coaxially fixed with said feed roller; said second subassembly for tape feed and triggering having a tape feed pawl shiftable through an oscillatory path and engageable in drive direction of its movement with said ratchet feed wheel; said sensing and switch selecting device comprising a plurality of pivotally mounted elongate tape sensing fingers each of which includes a tape sensing pin adapted to be shifted to project through one of said sensing holes and a switch operating arm; and a plurality of two-position transmitting switches each of which is associated with an operating arm of an individual one of said sensing fingers.

12. A tape reader as defined in claim 11, wherein said third subassembly comprises: a solenoid having a spring biased pivotable armature means, and a combination spring biased sensing assembly retracting and tripping latch means pivotally carried by said armature means; said first subassembly includes an abutment means adapted to be engaged by said retracting and tripping latch means upon oscillatory movement of said armature means in a first direction to a solenoid energized position to thereby enable positive shifting of said second subassembly to retract all said sensing pins simultaneously upon spring biased oscillatory movement of said armature means in a second direction to a solenoid de-energized position; and said tape feed and triggering device, the second subassembly, having a trigger means capable of engaging, shifting and tripping said retracting latch means upon pivotal movement in one direction under spring biasing force and an abutment means aadped to be shifted by said armature means upon oscillatory movement of said armature means in said first direction for moving said trigger means away from triggering engagement with said retracting latch means.

13. In combination in a demand type coded tape reader: a first coded tape sensing and switch selecting assembly comprising, a sensing lever carrier device, a plurality of combined sensing pin and switch operating levers pivotally mounted on said carrier device, independent resilient means biasing each said sensing lever toward a tape sensing position, a bail member on said carrier device eccentrically located relative to the pivotal mounting of said sensing levers adapted to cooperate simultaneously with all of said sensing levers to retract said sensing levers from a sensing position; a plurality of two-position switch devices, one of which is associated with each of said sensing levers adapted to be independently positioned to one or the other of said two positions depending upon whether or not said sensing lever senses a code hole in a message tape; a second tape feed and sensing assembly triggering device disposed for pivotal movement closely adjacent said sensing assembly; a power assembly comprising a solenoid, a solenoid electrical control circuit, a spring biased armature device adapted to be pivotally shifted against spring bias upon energization of said solenoid and having a latching means at one end thereof cooperating with said first and second assemblies, said armature device being adapted to cock said feed and triggering device upon energization of said solenoid and simultaneously latch into driving engagement with said carrier device whereby an external demand signal impulse providing an open condition of the solenoid control circuit will result in spring loaded release of said armature device to shift said carrier device and retract all sensing levers from a tape sensing position; said armature device including means operable during movement under spring bias force for tripping said feed and triggering assembly subsequent to sensing lever retraction thereby indexing said tape one feed step; and said feed and triggering device including means for triggered release of the latching means between said power assembly and said carrier device enabling spring biased return of said carrier and all sensing levers to a tape code hole sensing position subsequent to a tape feed step.

14. A cyclically operable tape reader controlled by demand impulses for reading punched code holes in a message tape comprising: a tape sensing station, a first pivotally mounted spring biased tape sensing and switch selecting assembly including tape sensing pins shiftable between sensing and non-sensing position, a second pivotally mounted spring biased assembly for tape feed and for triggering the sensing and switch selecting assembly to permit pivotal shift of the sensing assembly to a tape sensing position, releasable auxiliary means to latch said second assembly against spring biased movement, a third cyclically oscillatory power assembly comprising: a solenoid having a spring biased pivotable armature means and a combination spring biased sensing assembly retracting and tripping latch means pivotally carried by said armature means; said first assembly having an abutment means adapted to be engaged by said retracting and tripping latch means upon oscillatory movement of said armature means in a first direction to a solenoid energized position to thereby enable subsequent positive shifting of said second assembly to retract all said sensing pins simultaneously upon spring biased oscillatory movement of said armature in a second direction to a solenoid de-energized position; and said tape feed and triggering assembly, said second assembly, having a trigger device capable of engaging, shifting and tripping said retracting latch means upon pivotal movement in one direction under spring biasing force and an abutment means adapted to be shifted by said armature means upon oscillatory movement of said armature in said first direction for moving said trigger device away from triggering engagement with said retracting latch means and for enabling latching of said releasable auxiliary latching means with said second assembly.

15. In combination in a central telegraphic switching center a transmitting station including telegraphic data processing components consisting of at least a monitor reperforator, a transmitter-distributor, a teletypewriter including a tape perforator, a manual forwarding unit, a rerun tape reader, and control components enabling two modes of re-reading operation consisting of "pullback" and "retransmission," in each of which modes a previously transmitted message on a monitor reperforator tape is removed from the monitor reperforator and placed in a read position in said re-reader device; said control components enabling placing of said telegraphic data processing components into the "pullback" mode of operation wherein the rerun message code combinations are read and transmitted in simultaneous code impulses from said re-reader to said transmitter-distributor, converted to a sequential code and transmitted to a signal line, and at the same time locking out repunching of the "pullback" message by the monitor reperforator; and said control components also being capable of placing said telegraphic data processing components into the "retransmission" mode of operation wherein rerun message code combinations are read by said reader and transmitted in simultaneous code impulses to the transmitter-distributor which, in turn, sequentially transmits the code combination impulses to the teletypewriter set and its perforator punches a new tape which is manually processed through the manual forwarding unit to a signal line, said manual forwarding unit being connected in parallel to the monitor reperforator which reperforates a new monitor tape; and in both modes of operation, means being connected between said rerun reader and said transmitter-distributor so that code character transmission from said rerun reader to said transmitter-distributor is governed at a time rate of transmission in accord with demand impulse electrical signals under control of said transmitter-distributor.

16. In combination with a central telegraphic switching center, a demand controlled rerun tape reader component, a transmitter-distributor component, and control means connecting said two components providing control of a code combination reading cycle of rerun reader operation in response to a condition representative of a period in the cyclic transmission of a code combination by said transmitter-distributor component.

References Cited in the file of this patent

UNITED STATES PATENTS

| | | |
|---|---|---|
| 2,464,601 | Nichols | Mar. 15, 1949 |
| 2,782,254 | Johnston et al. | Feb. 19, 1957 |